3,166,603
ALKYL BERYLLIUM COMPOUNDS

Walter Strohmeier, Wurzburg, Germany, assignor to Ethyl Corporation, New York, N.Y., a corporation of Virginia
No Drawing. Filed Jan. 29, 1962, Ser. No. 169,635
Claims priority, application Germany, July 25, 1961, St 18,116
15 Claims. (Cl. 260—665)

The present invention is concerned with the preparation of organo beryllium compounds, especially ether-free alkyl or aryl beryllium compounds.

Alkyl and aryl berylium compounds and methods for their preparation have long been known. Most of the methods employed for their preparation involve the use of ether-containing reaction systems. For example, the most widely used method is the reaction of a Grignard reagent with a beryllium halide in ether. The presence of the ether promotes the reaction providing higher yields of the desired product. However, the alkyl or aryl beryllium product obtained is complexed with the ether employed in the reaction. Attempts have been made to remove the ether from certain of the alkyl and aryl beryllium compounds since, in particular applications, the ether is deleterious. A large proportion of the ether can be removed by distillation to obtain an organo beryllium compound containing about 5 to 6 or more weight percent ether. With additional and more tedious distillation, the ether can be brought down to about 3 weight percent. By way of particular example, the highest purity of diethyl beryllium previously reported in the literature contained 3 to 4 percent ether; Goubeau, Z. Anorg. Allg. Chem. 258, 162 (1948). However, even this small amount of ether contained in the organo beryllium compound is undesirable. For example, it is known that the alkyl beryllium compounds can be decomposed by powder metallurgy techniques to produce beryllium powder which, in turn, can be consolidated to a compact form for various uses. The presence of the ether is deleterious, however, resulting in considerable oxide of larger than desirable particle size. The beryllium oxide contaminated powder leaves something to be desired in that it is not as readily compacted.

Accordingly, there is a need for a simple and economical method for obtaining ether-free organo beryllium compounds. Therefore, an object of this invention is to provide a method for obtaining organo beryllium compounds of high purity. A particular object is the provision of a method for obtaining alkyl beryllium compounds essentially free of ether from ether contaminated alkyl beryllium compounds. A specific object is the provision of lower alkyl beryllium compounds essentially free of ether. These and other objects of the invention will be apparent as the discussion proceeds.

It has now been found that alkyl or aryl beryllium compounds essentially free of ether can be obtained by dissolving an alkali metal salt, a tetraalkylammonium salt, or both, in an alkyl or aryl beryllium compound containing ether, subjecting the reaction mixture to distillation at conditions for removal of the ether and after the desired quantity of the ether has been removed, subjecting the reaction mixture to further treatment, especially distillation conditions, for removal of the desired alkyl or aryl beryllium compound. In one embodiment, the ether-containing alkyl or aryl beryllium compound is treated with the alkali metal salt or tetraalkylammonium salt in amount sufficient to form a complex between the salt in question and the alkyl or aryl beryllium compound in proportions of 1 mole of the salt with at least 2 moles of the beryllium compound. In certain cases four moles of the beryllium compound is used per mole of alkali metal salt. Of the alkali metal salts, the akali metal fluorides, especialy potassium fluoride, and the alkali metal cyanides, especially potassium cyanide, are particularly preferred. Of the tetraalkylammonium salts, the halides, especially the fluorides and most especially the chlorides are preferred, particularly when associated with tetraalkylammonium cations containing the lower alkyl groups, such as methyl, ethyl, propyl and butyl groups. Likewise, the process is particularly applicable to alkyl beryllium compounds contaminated with simple lower alkyl ethers, especially diethyl ether. Thus, a particular embodiment of the invention comprises the treatment of diethyl beryllium-diethyl ether etherate, or diethyl beryllium in diethyl ether solution, with potassium fluoride in proportions of 1 mole of the potassium fluoride with at least 2 moles of the diethyl beryllium under conditions to effect at least partial solution of the potassium fluoride in the diethyl beryllium; subjecting the system to conditions for distilling off the diethyl ether upon completion of the solution of the potassium fluoride; and then subjecting the system to distillation conditions for removal of the diethyl beryllium after the desired amount of ether has been removed. These and other embodiments of the invention will be evident as the discussion proceeds.

The present process provides a simple and economical technique for obtaining alkyl or aryl beryllium compounds which are essentially free of ether. While, in general, any desired amount of ether can be removed quite effectively from the alkyl or aryl beryllium compounds according to the process, in all instances, if desired, the ether content can be reduced to below 1 percent by weight and even lower. In a particularly efficacious embodiment of the invention, wherein complexes of the alkali metal salt or the tetraalkylammonium salt with the alkyl or aryl beryllium compound in the ratio of 1:2, respectively, are obtained by adjustment of the stoichiometry, one can readily obtain an alkyl or aryl beryllium compound completely free of the ether. This processing while still involving distillation operations accomplishes the removal of the ether by less tedious distillation in addition to the more effective removal. Further, as will be brought out hereinafter, simplified processing techniques are now made possible wherein a medium of a 1:1 complex residuum is maintainable to which appropriate amounts of ether-contaminated alkyl or aryl beryllium compound can be added with subsequent sequential removal of the ether and the same amount of ether-free alkyl or aryl beryllium compound as was added. In this manner, therefore, only a small amount of the complexing salt is required for removing infinite amounts of ether from alkyl or aryl beryllium compounds. These and other advantages of the process will be apparent as the discussion proceeds.

The alkyl or aryl beryllium compounds contaminated with ethers purified according to the process of this invention are well known. In general, the alkyl or aryl groups of these beryllium compounds are hydrocarbon groups, particularly wherein the alkyl groups have up to and including about 18 carbon atoms and the aryl groups contain up to and including about 10 carbon atoms. Typical examples of such materials are dimethyl beryllium, diethyl beryllium, dipropyl beryllium, di-tert-butyl beryllium, dihexyl beryllium, dioctyl beryllium, ethyl hexyl beryllium, ethyl methyl beryllium, didecyl beryllium, dioctadecyl beryllium, diphenyl beryllium, dibenzyl beryllium, ditolyl beryllium, and the like. The alkyl beryllium compounds, especially those wherein each alkyl group contains up to about 6 carbon atoms are particularly preferred.

As indicated, such alkyl or aryl beryllium compounds are contaminated with ethers. The connotation of "contaminated" is intended to denote the alkyl or aryl beryllium ether complexes as well as simple solutions of alkyl or aryl beryllium compounds in ethers or alkyl or aryl beryllium-ether complexes dissolved in ethers. Such materials are well known in the art and are obtained, for example, by the reaction of a Grignard reagent with a beryllium halide in an appropriate ether solvent. While all types of ethers are generally employed, the saturated ethers are most practical. Generally speaking, the ethers can be non-aromatic, aromatic, and polyethers. The non-aromatic ethers include the mono-aliphatic and mixed ethers. Typical examples of the mono-aliphatic ethers which are employed are dimethyl ether, diethyl ether, di-n-butyl ether; di-sec-butyl ether; diisobutyl ether; di-n-amyl ether; di-n-heptyl ether; and the like saturated and unsaturated ethers. Examples of the mixed ethers which are employed are methyl ethyl ether; n-amylmethyl ether; tert-amylethyl ether; n-butylisopropyl ether; ethyl-isoamyl ether; n-butyl-n-propyl ether; and the like. The aromatic ethers include, for example, the mono-aromatic ethers, alkyl aryl ethers, and the alkaryl alkyl ethers. Typical examples of the mono-aromatic ethers include dibenzyl ether; diphenyl ether; and the like. When the aromatic ether is an alkyl aryl ether, one can employ, for example, methylphenyl ether; methyl-o, m, or p-tolyl ether; methyl-α-naphthyl ether; ethylphenyl ether; ethyl-o, m, or p-tolyl ether; ethyl-α-naphthyl ether; phenyl-n-propyl ether; isopropylphenyl ether; n-butyl-o-tolyl ether; isoamyl-n-naphthyl ether; and the like. The alkaryl alkyl ethers which are employed can be, for example, benzylmethyl ether; benzylethyl ether; benzyl-n-butyl ether; and the like. Examples of the polyethers which are employed are those having the configuration $R-O-(CH_2)_n-O-R$ wherein R is an organic radical, preferably hydrocarbon or ether radicals, and $n$ is a small whole number as between about 1 to 10, preferably 1 to 3 inclusive. For example, such polyethers include ethylene glycol ethyl methyl ether, the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane; diethyl ether of diethylene glycol; and the like. Other polyesters which can be employed include, for example, pyrocatechol dimethyl ether; resorcinol dimethyl ether; 1,2,4-trimethoxybenzene, and the like. Generally speaking, this invention is most readily adapted to the purification of organoberyllium compounds initially associated with ethers which can be distilled at temperatures of up to about 100° C. using reduced pressures, if necessary.

Accordingly, the materials treated by the process of this invention are combinations of the above alkyl or aryl beryllium compounds complexed with or in solution with the above and other ethers. By way of illustration of such materials are included diethyl beryllium-diethyl etherate; di-tert-butyl beryllium-diethyl etherate; diethyl beryllium-diamyl etherate; diethyl beryllium-tetrahydrofuran etherate; di-tert-butyl beryllium-dimethyl ether of diethylene glycol etherate; di-tert-butyl beryllium-diethyl ether of diethylene glycol etherate; diphenyl beryllium-diethyl etherate; and the like as well as solutions of such etherates in the same or other ethers. Generally, complexes of ethers which have lower boiling points than the alkyl or aryl beryllium compound with which they are complexed as well as the dissociation temperature of the alkali metal salt-organoberyllium compound formed are most effectively treated by the process and thus preferred. The processing is particularly effective for the removal of the more stable alkyl beryllium complexes with ethers, particularly the lower dialkyl beryllium compounds wherein each alkyl group contains up to and including about 4 carbon atoms complexed with the lower simple alkyl ethers (ROR, wherein each R is an alkyl group containing up to and including about 4 carbon atoms). By way of example of such alkyl beryllium etherates, diethyl beryllium-diethyl etherate and di-tert-butyl beryllium-diethyl etherate comprise particular embodiments very effectively treated according to the process.

The alkali metal salts employed in the processing of this invention are subject to choice. The alkali metals include those metals of Group I-A of the Periodic Chart of the Elements, e.g. lithium, sodium, potassium, rubidium, and cesium. Generally speaking, the salts of the alkali metals of atomic numbers 19 through 55—i.e. K, Rb and Cs—are preferred for use in this invention. The alkali metal salts can be salts of organic or inorganic acids, the latter being generally more efficacious. Thus, the alkali metal salts include the alkali metal halides, alkali metal alcoholates (MOR) wherein the hydrocarbon portions contain up to and including about 18 carbon atoms; alkali pseudohalides as, for example, the alkali metal cyanides, cyanates, thiocyanates, amides, mercaptides, azides, and the like; organic acid salts as, for example, the alkali metal salts of organic acids wherein the hydrocarbon portions have up to and including about 18 carbon atoms, and other inorganic acid salts such as the alkali metal sulfates, nitrates, borates, phosphates, arsenates, and the like. Typical examples of such alkali metal salts include potassium chloride, bromide, iodide, or fluoride; potassium sulfide, potassium sulfate, sulfonate, sulfinate, carbonate, nitrate, phosphate, cyanate, thiocyanate, cyanide dithionate, borate, selenate, antimonate, tungstate, and the like; potassium formate, acetate, propionate, phenolate, ethylate, benzoate, isobutyrate, and the like; including such compounds wherein lithium, sodium, rubidium, or cesium are substituted for potassium. Thus, in general, such alkali metal salts are those which form definite solvates or displace the ether. The alkali metal halides, especially the fluorides, and cyanides, comprise particularly preferred alkali metal salts. The fluorides and cyanides of potassium, rubidium and cesium comprise an even more preferred embodiment because of their easier solution and complexibility with the alkyl beryllium compounds, although effective use may be made of the low cost materials, sodium fluoride and sodium cyanide.

Of the tetraalkylammonium salts used in this invention, the tetraalkylammonium halides, especially the fluorides and most especially the chlorides, are preferred. Examples of these particularly preferred quaternary ammonium salts include tetramethyl ammonium chloride, tetraethyl ammonium chloride, tetraethyl ammonium fluoride and the higher homologs of these compounds in which the alkyl groups are preferably lower alkyl groups containing up to about 6 carbon atoms. Other useful and preferred quaternary ammonium halide salts include tetraethyl ammonium bromide, tetramethyl ammonium iodide and similar analogous compounds. If desired, use may be made of such compounds as dimethyl ethyl octadecyl ammonium bromide as well as the quaternary ammonium salts in which the anion is sulfate, cyanide, or a derivative of an aliphatic monocarboxylic acid such as the acetate and propionate anions.

The foregoing alkali metal salts and quaternary ammonium salts can also be employed in the form of their 1:1 molar complexes with an alkyl or aryl beryllium compound which is the same or different than the alkyl or aryl beryllium compound contaminated with ether that is to be treated. Thus, any of the above alkyl or aryl beryllium compounds complexed with any of the above alkali metal salts or tetraalkylammonium salts can be employed. Typical examples of such complexes or mixtures are the 1:1 molar combinations as, for example, potassium fluoride-diethyl beryllium; potassium fluoride-di-tert-butyl beryllium; potassium cyanide-diethyl beryllium, potassium cyanide-di-tert-butyl beryllium; cesium fluoride-diethyl beryllium; cesium fluoride-di-tert-butyl beryllium; potassium fluoride-diphenyl beryllium; tetramethylammonium chloride-diethyl beryllium; and the like. Such complexes or solvated mixtures are readily obtainable generally by merely mixing the salt with the alkyl or aryl beryllium compound with heating, if necessary, until the salt goes into solution, removing undissolved salt, if desired. It will be readily understood that such complexes can be pre-formed or prepared in situ. Here also, the 1:1 complexes of potassium fluoride or cyanide with the lower alkyl beryllium compounds, especially diethyl beryllium or di-tert-butyl beryllium, comprise particularly preferred embodiments.

Example I

Into a reactor maintained under a nitrogen atmosphere was added 5 ml. of diethyl beryllium which contained 20 volume percent diethyl ether. Then, 1 gram of potassium fluoride was added and the mixture was stirred for 3 hours. At the end of this period, a portion of the ether was distilled off by simply placing a vacuum on the system. The mixture was then heated to 65° C. at atmospheric pressure and with stirring whereupon all of the potassium fluoride went into solution. The reaction mixture was then cooled to room temperature and the remainder of the ether was removed by the application of a vacuum on the system. When all of the ether had been removed, the viscous solution suddenly became solid. This product was washed with 5 ml. of heptane, then dried in a vacuum. Analysis of the product, which involved hydrolysis with methanol followed by hydrochloric acid to produce $Be(OH)_2$ which was fired and weighed as beryllium oxide, gave the values 24.9 percent BeO, 10.1 percent fluorine and 20.4 percent potassium whereas $KF.2(C_2H_5)_2Be$ theoretically requires 26 percent BeO, 9.88 percent fluorine and 20.3 percent potassium. A portion of this product was then heated at between 60 to 70° C. and a high vacuum whereby diethyl beryllium completely free of any ether distilled over and was recovered leaving the 1:1 complex $KF.Be(C_2H_5)_2$ in the reactor.

To illustrate the reuse of the residuum 1:1 molar complex, the following example is presented.

Example II

The 1:1 complex obtained in the preceding example was left in the reactor and additional diethyl beryllium, 2.5 parts, containing 6 percent by weight of diethyl ether was added thereto. The mixture was heated to 65° C. with stirring and then cooled to room temperature. A vacuum was applied to the system whereby all the diethyl ether was removed and again the viscous solution suddenly became solid. The solids were heated to 60 to 70° C. under a high vacuum distilling over ether free diethyl beryllium in essentially quantitative yield and again leaving the 1:1 complex, $KF.Be(C_2H_5)_2$, in the reactor. This procedure can be repeated indefinitely to provide a continuous method for purifying diethyl beryllium and other alkyl beryllium compounds containing ethers.

Example III

In this run, 2 grams of rubidium fluoride was placed in the reactor and a nitrogen atmosphere maintained. The reactor was then cooled to a −80° C. Then 5 ml. of diethyl beryllium containing 15 percent by weight of diethyl ether was added to the reactor. The reaction mixture was heated to room temperature whereby reaction took place accompanied by a slight evolution of heat. These conditions were maintained for about 2 hours with continuous stirring. During this time, all of the rubidium fluoride had dissolved. Then the reaction mixture was subjected to a vacuum to pump off the ether whereupon the reaction product immediately solidified. After washing this product three times with 5 ml. portions of heptane and drying under vacuum, the white powder obtained had a melting point between 61 to 63° C. Analysis of the product showed 20.8 percent beryllium oxide, 7.70 percent fluorine, 35.45 percent rubidium, whereas the rubidium fluoride-di-diethyl beryllium complex $(RbF.2Be(C_2H_5)_2)$ theoretically involve 20.7 percent beryllium oxide, 7.97 percent fluoride, 35.75 percent rubidium. When this product is subjected to vacuum distilliation at a temperature between about 60 to 70° C. as in Example I, diethyl beryllium, essentially completely free of ether, is obtained leaving the analogous 1:1 complex in the reactor.

Example IV

Example I is repeated essentially as described with exception that an equivalent amount of sodium fluoride was substituted for the potassium fluoride. After stirring for 5 hours, the ether evaporation proceeded more slowly and it was noted that some of the sodium fluoride did not go into solution. About a 12 percent yield of the complex $NaF.2Be(C_2H_5)_2$ was indicated as being obtained by separate analysis. Thus, this example illustrates that sodium fluoride is not as effective as potassium fluoride, but can be employed for removing ether from diethyl beryllium.

Example V

Example III was repeated essentially as described with exception that cesium fluoride was substituted for rubidium fluoride. In this instance, reaction began as soon as the diethyl beryllium had melted. At the end of a 1 hour reaction period, the suspension was heated with stirring to 50° C. whereupon a clear brownish solution formed. The mixture was cooled to room temperature and the ether pumped off under vacuum. From this product, which by analysis showed essentially $CsF.2Be(C_2H_5)_2$, one mole of diethyl beryllium free of ether can be obtained.

Example VI

Again proceeding essentially as described in Example I, 1 gram of potassium cyanide was combined with 3 ml. of diethyl beryllium containing diethyl ether. The mixture was heated to 60° C. and maintained at this temperature for 6 hours whereby all of the potassium cyanide went into solution. The mixture was then subjected to a vacuum whereby essentially all of the ether was removed. The product was extracted with heptane to remove any excess diethyl beryllium. Analysis of the product indicated it to be $KCN.2Be(C_2H_5)_2$. This product can be heated under vacuum to remove ether-free diethyl beryllium.

Example VII

One gram of potassium cyanide was combined with 10 ml. of diethylberyllium which contained 40 percent of diethyl ether. The mixture was maintained for 5 hours at 60° C., whereupon the potassium cyanide dissolved with the formation of a clear solution. Vacuum was then applied to the system at 60° C. whereupon all the ether could be removed. The liquid product was then stirred vigorously with 15 ml. of heptane in order to remove the excess diethylberyllium. In the course of this treatment, the solution became ever more viscous and suddenly solidified in part to a white crystalline mass melting at 52° C. After decantation of the heptane solution and drying of the product, its composition corresponded to $KCN.4Be(C_2H_5)_2$. Analysis: Found: BeO =30.7%, K=12.0%, CN=7.8%, whereas the complex requires: BeO=30.0%, K=11.7%, CN=7.8%. Upon warming under high vacuum, this product yields ether-free diethylberyllium.

Similar results are obtained when the above example is repeated substituting sodium, lithium, rubidium, or cesium cyanide for potassium cyanide in equivalent amounts.

Example VIII

The procedure of Example I is repeated with exception that an equivalent amount of sodium ethylate is employed in place of potassium fluoride. Essentially pure diethyl beryllium may be obtained by removing the ether and subsequently distilling the complex.

When the above example is repeated substituting potassium butylate, rubidium octanoate, cesium decylate, or sodium phenolate for sodium ethylate, equally satisfactory results are obtained.

Example IX

Proceeding essentially as in Example III, one gram of tetraethylammonium chloride was reacted with ether-containing diethylberyllium. The tetraethylammonium chloride dissolved completely at room temperature within a half hour in the diethylberyllium to yield a water-clear solution. Upon application of a vacuum the ether was removed quantitatively within a very short period. The liquid reaction mixture was twice stirred thoroughly with 15 ml. of heptane in which it is insoluble. The heptane was decanted and the residual viscous liquid was subjected to a vacuum in order to remove the heptane. The analysis of the product gave: Found: BeO=16.9%, $N(C_2H_5)_4$=44.0%, Cl=11.7%, whereas the compound $N(C_2H_5)_4Cl:2Be(C_2H_5)_2$ requires: BeO=16.7%, $$N(C_2H_5)_4=43.5\%$$

Cl=11.8%.

When the above example is repeated substituting tetraethylammonium fluoride, tetramethylammonium chloride, or tetrapropylammonium bromide for the tetraethylammonium chloride, generally similar results are achieved.

*Example X*

Employing the procedure of Example II, a 1:1 molar complex of potassium cyanate with di-n-butyl beryllium containing ether is first prepared by heating an equimolar mixture of the two until essentially all of the potassium cyanate goes into solution. Then the reaction mixture is cooled to room temperature and a vacuum applied to the system to remove essentially all of the ether leaving a solid 1:1 molar complex of potassium cyanate with diethyl beryllium. To this residual complex is added essentially 1 mole of di-n-butyl beryllium-diethyl etherate and the mixture heated to about 80° C. with stirring and maintained at this temperature for about 2 hours. The reaction mixture is then cooled to room temperature and a high vacuum applied for drawing off all the ether. While maintaining the high vacuum, after completion of the removal of the ether, the reaction mixture is heated to about 100° C. whereby essentially pure di-n-butyl beryllium is withdrawn from the reactor and recovered leaving the 1:1 molar complex of potassium cyanate and di-n-butyl beryllium in the reactor as residue. The foregoing procedure can then be repeated for purifying additional di-n-butyl beryllium containing ether.

Similar results are obtained when other alkali metal cyanates or salts in general are substituted for potassium cyanate in the above example as, for example, sodium cyanate, potassium carbonate, potassium thiocyanate, lithium sulfate, sodium phosphate, and the like.

*Example XI*

Employing the procedure of Example I, essentially 1 mole of potassium fluoride is added to essentially two moles of the tetrahydrofuran etherate of di-tert-butyl beryllium. The mixture is heated to 60° C. with stirring for a period sufficient to dissolve essentially all of the potassium fluoride. While maintaining the reaction mixture at this temperature, a vacuum is drawn on the system until essentially all of the tetrahydrofuran is drawn off and cooled. While maintaining the vacuum, the reaction mixture is heated to about 100° C. whereby di-tert-butyl beryllium, essentially free of ether, is distilled from the reaction mixture and separately cooled leaving the 1:1 molar complex of potassium fluoride and di-tert-butyl beryllium-tetrahydrofuran etherate essentially equal to the molar quantity of the 1:1 complex potassium fluoride-di-tert-butyl beryllium residuum is added to the reactor and the above operations repeated. In this manner, a continuous production of di-tert-butyl beryllium free of the ether is obtained.

When the above example is repeated with exception that the corresponding dibutyl ether, dioxane, and the like etherates of di-tert-butyl beryllium are employed in place of the tetrahydrofuran contaminated di-tert-butyl beryllium starting material of the above example, equally satisfactory results are obtained.

*Example XII*

Employing the procedure of Example XI, the operations are repeated with exception that the di-dimethyl ether of diethylene glycol etherate of di-n-propyl beryllium is substituted for the tetrahydrofuran etherate of di-tert-butyl beryllium. In this instance, di-n-propyl beryllium, essentially free of the dimethyl ether of diethylene glycol, is obtainable.

When the above example is repeated substituting other ethers, especially glycol ethers as, for example, the diethyl, dipropyl, dibutyl, and the like ethers of diethylene glycol, triethylene glycol, and tetraethylene glycol in the starting di-n-propyl beryllium etherate for the dimethyl ether of diethylene glycol, equally good results are obtained.

The above examples have been presented by way of illustration. It is not intended to be limited thereto. It will now be evident that other alkyl or aryl beryllium compounds contaminated with various ethers as described hereinbefore may be substituted and treated with other alkali metal salts and quaternary ammonium salts to ether-free alkyl or aryl beryllium compounds.

As indicated above, the treatment of the ether contaminated alkyl or aryl beryllium compounds with the alkali metal salt or tetraalkylammonium salt can be effected under a variety of conditions. Generally, the reaction and solution will take place at room temperature and lower or at elevated temperatures up to the decomposition temperature of the reactants or products. Ordinarily, when heat is required, only sufficient heat is applied for dissolution of the amount of the complexing salt employed in the treatment. For best operations, the formation of the complex is performed at temperatures between about −25° to 75° C.

The proportion of the complexing salt employed in relation to the ether contaminated alkyl or aryl beryllium compound is subject to considerable latitude. As a practical matter, at least one mole of the ether contaminated alkyl or aryl beryllium compound per mole of the alkali metal salt or tetraalkylammonium salt is employed. For best results, it is preferred to employ at least 2 moles of the ether contaminated alkyl or aryl beryllium compound per mole of the complexing salt. In those instances wherein a residual 1:1 molar complex of the complexing salt to the alkyl or aryl beryllium compound is employed as a treating agent, then at least one mole of the ether contaminated alkyl or aryl beryllium per mole of the 1:1 complex is employed.

As indicated previously, the amount of ether contained in the ether contaminated alkyl or aryl beryllium compound to be treated can be quite varied. By way of example, alkyl or aryl beryllium compounds containing as little as 1 percent of an ether or solutions of alkyl or aryl beryllium compounds in an infinite amount of ether are effectively treated according to the procedure of this invention. Ether contaminated alkyl or aryl beryllium compounds wherein the ether content is between about 1 percent up to about 10 weight percent and more especially 3 percent up to about 6 weight percent are particularly well suited to the treatment of this invention. Generally, the ethers form complexes with the alkyl or aryl beryllium compounds although simple ether solutions of the alkyl or aryl beryllium compounds or ether solutions of alkyl or aryl beryllium compounds complexed with ethers are also contemplated.

After treatment of the ether contaminated alkyl or aryl beryllium compound with the complexing salt, the ether is more easily removed from the reaction system by distillation and, in some instances, decantation. Ordinarily, distillation is preferably employed since more complete removal of the ether can be obtained. The conditions necessary for such distillation are subject to considerable latitude dependent primarily upon the boiling point of the ether with which the alkyl or aryl beryllium compound is contaminated. Thus, all one need employ is the appropriate temperature and pressure conditions for boiling the ether from the reaction system. For most effective removal of the ether, it is preferred to apply a vacuum to the system to draw off the ether either at room temperature or elevated temperature as the conditions may require. Of course, temperatures above the decomposition temperature of the ether-free alkyl or aryl beryllium compound are to be avoided. Ordinarily, temperatures below 100° C. are employed during the distillation in order not to entrain the alkyl or aryl beryllium compound or result in degradation of the components of the reaction mixture. Pressures as low as about 0.01 mm. of mercury absolute are employable.

After the ether has been removed, the alkyl or aryl beryllium compound can likewise be removed by distillation employing the same criteria of distillation conditions as discussed in the previous paragraph concerning removal of the ether, that is, the alkyl or aryl beryllium compound is preferably recovered by distillation at temperatures below about 100° C. applying appropriate vacuum down to about 0.01 mm. of mercury absolute pressure as required.

A non-distillation method for the separation of the ether-free alkyl or aryl beryllium compound from the reaction mixture involves treating the ether-free reaction mixture with suitable hydrocarbons, especially saturated aliphatic or aromatic hydrocarbons. This technique is especially preferred when a complex in the ratio of 1 mole of alkali metal salt to at least two moles of alkyl or aryl beryllium compound has been formed in the initial complexation step. This method is the method of choice in those cases where the decomposition of the complex by distillation is impractical because of the low decomposition temperature of the alkyl or aryl beryllium compound to be isolated. When breaking down the complexes of the general formula $MX:nBeR_2$ ($MX$=alkali metal salt, $n$=2 or 4, $R$=alkyl or aryl) with a suitable hydrocarbon, the decomposition proceeds first to the 1:1 complex with liberation of the corresponding ether-free alkyl or aryl beryllium compound which remains dissolved in the hydrocarbon, whereas the complex $MX:BeR_2$, which is less soluble than the initial complex, $MX:nBeR_2$ is precipitated. In principle, even the 1:1 complex thus obtained can be decomposed, by a sufficiently large amount of a suitable hydrocarbon, to pure alkali metal salt and to ether-free alkyl or aryl beryllium compound. By the use of suitable complex salts and a suitable hydrocarbon, e.g., benzene, it is possible even with the use of relatively small amounts of hydrocarbon solvent to decompose the 1:2 complex into MX and pure dialkyl or diaryl beryllium.

To illustrate this embodiment of the invention, the following examples are presented.

Example XIII

The procedure of Example I was employed essentially as described for preparing the 1:2 molar complex of potassium fluoride with diethyl beryllium and the ether distilled as indicated. The 1:2 molar complex ($KF.2(C_2H_5)_2Be$), 1½ grams, was mixed with 15 ml. of benzene at 70° C. Two phases formed and the benzene solution was decanted leaving a crystalline substance. This crystalline substance was dried in a vacuum and then analyzed according to the procedure indicated in Example I. Upon analysis, it was found that the residual product showed 20.4 percent BeO, 15.5 percent fluorine, and 30.9 percent potassium whereas the 1:1 molar complex of potassium fluoride with diethyl beryllium ($KF.(C_2H_5)_2Be$) theoretically shows 19.95 percent BeO 15.25 percent fluorine and 31.2 percent potassium. The benzene solution contained the ether-free diethyl beryllium which was isolated therefrom.

Example XIV

Three grams of the 1:2 complex, $KF.2Be(C_2H_5)_2$, obtained as in Example I, were finely powdered and stirred for several hours with 10 ml. of benzene at 20° C. The suspension was allowed to settle, the benzene solution was decanted from the precipitate and the precipitate was dried and analyzed. It proved to be the pure 1:1 complex, $KF.Be(C_2H_5)_2$. To the benzene solution, 20 ml. of heptane was added and the mixture was stirred. This resulted in the precipitation of the 1:2 complex still in the solution and the benzene-heptane mixture now contained pure diethyl beryllium. The solvent was removed by fractional distillation and the ether-free diethylberyllium was obtained.

Examples XIII and XIV were given for the purpose of illustration. However, the methods are not limited to these examples. Equally good results were obtained, for example, with potassium, rubidium and cesium salts and with other alkyl or aryl beryllium compounds such as, for example, di-n-hexyl-, di-sec-butyl-, dioctyl- and diphenylberyllium compounds contaminated with the same ethers as above or with dioxane, di-n-butyl ether, diethylene glycol diethyl ether, diethylene glycol methyl ethyl ether or tetrahydrofuran.

Examples XIII and XIV thus illustrate this alternative embodiment for separating the ether-free alkyl or aryl beryllium compound. Thus, the hydrocarbon treatment can be employed rather than distillation for recovery of the ether-free alkyl or aryl beryllium compound in any of the appropriate examples above. Further, other hydrocarbons can be employed in this treatment and, in general, such need only be essentially inert in the reaction system and liquid under the conditions of treatment. Thus, other hydrocarbons include saturated aliphatics such as the hexanes, octanes, nonanes, cyclopentane, cyclohexane, alkyl-substituted cyclopentanes and cyclohexanes, and the like, and aromatics such as toluene, o-, m-, or p-xylene, mesitylene, tetrahydronaphthalene, and the like with benzene and toluene being particularly preferred. This treatment can be done at varying conditions merely by mixing the hydrocarbon compound with the now ether-free alkali metal salt-alkyl or aryl beryllium complex. The most favorable reaction temperature also varies from system to system and usually lies between 20 and 100° C. In general, the most favorable choice of the reaction temperature and of the amount of solvent to be used is a function of the temperature dependence of the particular equilibrium constants of the reactants. However, it is preferable to employ the hydrocarbon compound in the liquid state pre-heated to temperatures between about 50 to 100° C. The amount of aromatic solvent employed can be varied from minor amounts to excess or solvent quantities although, in general, for best results between about 1 to 100 parts of the hydrocarbon solvent per part by weight of the alkyl or aryl beryllium compound initially employed as starting material are preferred. If desired, the alkyl or aryl beryllium compound can be further separated from the hydrocarbon by distillation under suitable conditions. However, it is not necessary to separate the ether-free alkyl or aryl beryllium compounds obtained in accordance with this invention from the hydrocarbon solvents used for precipitation since these solutions can be used directly for the further application of the now ether-free alkyl or aryl beryllium compounds.

The alkyl or aryl beryllium compounds obtained according to the process of this invention are of considerable utility. Indeed, they are more useful than the previously prepared alkyl or aryl beryllium compounds contaminated with ethers. By way of example, it is now possible to form beryllium powders without the concomitant deleterious effects of beryllium oxide formation. The alkyl or aryl beryllium compounds are also readily pyrolyzed to produce beryllium hydride uncontaminated by an ether. Further, the ether-free alkyl or aryl beryllium compounds can be employed as alkylating agents for the formation of other metal alkyls or aryls. By way of example, diethyl beryllium can be reacted with a lead salt, such as lead acetate, to produce tetraethyllead in high yield and free of ether contamination. The complexes of the alkali metal salt with one or two moles of the alkyl or aryl beryllium compound per mole of the alkali metal salt after removal of the ether therefrom as described above are also of considerable utility. In particular, these complexes in addition to providing a source or method for obtaining ether-free alkyl or aryl beryllium compounds are well suited as electrolytes or components of electrolytes for the production of organometallic compounds. In particular, employing an electrolytic cell, one need only use an appropriate metal anode, such as lead, tin, magnesium, antimony, or the like employing electrolyte containing a complex of an alkyl beryllium compound with an alkali metal salt, especially potassium or sodium fluoride or cyanide, or mixtures thereof with an essentially inert cathode, applying a current to the cell thereby producing the corresponding lead, tin, magnesium, antimony, or the like alkyl continuously in high efficiency. Other uses of the ether-free alkyl or aryl beryllium compounds or alkyl or aryl beryllium complexes will now be evident.

While the above discussion has been confined to alkyl or aryl beryllium compounds, it will now be evident that the processing is applicable to other organoberyllium compounds such as the unsaturates, cycloaliphatics, and the like, e.g. dicyclohexyl beryllium, dihexenyl beryllium, and the like.

Having thus described the novel process and products of this invention, it is not intended to be limited except as set forth in the following claims.

I claim:

1. A process for the manufacture of high purity beryllium compounds which comprises treating a beryllium compound selected from the group consisting of alkyl and aryl beryllium compounds contaminated with an ether by dissolving therein a salt selected from the group consisting of alkali metal halides, alkali metal alcoholates, alkali metal cyanides, alkali metal cyanates, alkali metal thiocyanates, alkali metal amides, alkali metal mercaptides, alkali metal azides, alkali metal salts of organic acids, alkali metal sulfates, alkali metal nitrates, alkali metal borates, alkali metal phosphates, alkali metal arsenates, and tetraalkylammonium halides, subjecting the mixture so obtained to distillation for removal of the ether therefrom, then subjecting the reaction mixture to further treatment for removal of the beryllium compound desired.

2. The process of claim 1 wherein said salt is the fluoride of an alkali metal of atomic number 19 through 55 inclusive.

3. The process of claim 1 wherein said salt is a tetraalkylammonium halide.

4. The process of claim 1 wherein said salt is a tetraalkylammonium chloride.

5. The process of claim 1 wherein said salt is an alkali metal halide.

6. The process of claim 1 wherein said salt is potassium fluoride.

7. The process of claim 1 wherein said salt is potassium cyanide.

8. A method for the purification of ether contaminated alkyl beryllium compounds which comprises reacting an ether containing alkyl beryllium compound with a salt in amount of at least 2 moles of the former per mole of the latter to form a definite chemical complex between said salt and said alkyl beryllium compound, then subjecting the reaction mixture to distillation conditions for removal of the ether from the system and then subjecting the system to distillation conditions for removal of the alkyl beryllium compound, said salt being selected from the group consisting of alkali metal halides, alkali metal alcoholates, alkali metal cyanides, alkali metal cyanates, alkali metal thiocyanates, alkali metal amides, alkali metal mercaptides, alkali metal azides, alkali metal salts of organic acids, alkali metal sulfates, alkali metal nitrates, alkali metal borates, alkali metal phosphates, alkali metal arsenates, and tetraalkylammonium halides.

9. The process of claim 8 wherein said alkyl beryllium compound is diethyl beryllium contaminated with diethyl ether and said alkali metal salt is potassium fluoride.

10. The process of claim 8 wherein said salt is the fluoride of an alkali metal of atomic number 19 through 55 inclusive.

11. The process of claim 8 wherein said salt is an alkali metal halide.

12. The process of claim 8 wherein said salt is potassium fluoride.

13. The process of claim 8 wherein said salt is potassium cyanide.

14. The process of claim 8 wherein said salt is a tetraalkylammonium halide.

15. The process of claim 8 wherein said salt is a tetraalkylammonium chloride.

References Cited in the file of this patent

Zeitschrift fur Naturforschung, November 1961, page 760.